United States Patent [19]
Tagami

[11] Patent Number: 5,997,226
[45] Date of Patent: Dec. 7, 1999

[54] CUTTING TOOL CHUCK WITH NON-CIRCULAR CROSS-SECTION AND CUTTING TOOL CHUCK ASSEMBLY

[76] Inventor: Tetsuro Tagami, 1976-1, Yanokuchi, Inagi-shi, Tokyo-to, Japan

[21] Appl. No.: 09/037,151

[22] Filed: Mar. 9, 1998

Related U.S. Application Data

[63] Continuation of application No. PCT/JP97/02684, Aug. 1, 1997.

[51] Int. Cl.[6] ........................................ B23C 5/26
[52] U.S. Cl. .................... 409/231; 279/103; 408/239 A; 409/232; 409/234
[58] Field of Search .................... 409/231, 232, 409/233, 234; 279/9.1, 102, 103, 22, 133, 158, 903; 408/238, 239 A, 239 R, 240, 226

[56] References Cited

U.S. PATENT DOCUMENTS

| | | | |
|---|---|---|---|
| 1,052,309 | 2/1913 | Boone | 279/103 |
| 2,440,908 | 5/1948 | Mueller | 279/9.1 |
| 2,772,094 | 11/1956 | Jamilkowski et al. | 279/9.1 |
| 3,521,896 | 7/1970 | Matsumoto | 279/22 |
| 3,774,928 | 11/1973 | Hanak et al. | 279/22 |
| 4,021,051 | 5/1977 | Toyomoto et al. | 279/103 |
| 4,293,253 | 10/1981 | Ott | 408/226 |
| 4,657,454 | 4/1987 | Migita et al. | 409/234 |
| 4,721,423 | 1/1988 | Kubo | 279/103 |
| 4,799,838 | 1/1989 | Kubo et al. | 279/903 |
| 4,834,597 | 5/1989 | Andersson et al. | 409/234 |
| 4,934,883 | 6/1990 | Andersson et al. | 279/103 |
| 5,322,304 | 6/1994 | Rivin | 279/103 |
| 5,595,391 | 1/1997 | Rivin | 409/234 |
| 5,788,249 | 8/1998 | Tagami | 409/234 |

FOREIGN PATENT DOCUMENTS

| | | |
|---|---|---|
| 0294348 | 12/1988 | European Pat. Off. . |
| 48-20072 | 3/1973 | Japan . |
| 61-54441 | 4/1986 | Japan . |
| 6114612 | 4/1994 | Japan . |
| 8323517 | 12/1996 | Japan . |

Primary Examiner—Daniel W. Howell
Attorney, Agent, or Firm—Ladas & Parry

[57] ABSTRACT

A cutting tool chuck comprises a spindle provided with a tapered bore having the shape of a regular hexagonal prismoid for receiving a shank of a tool holder or a cutting tool, a retainer placed in the tapered bore of the spindle, and a plurality of rollers held in place by the retainer so as to be in rolling contact with the surfaces defining the tapered bore and the surfaces of the shank. The retainer has a plurality of retaining ribs extending along ridge sections of the tapered bore, an upper connecting ring to which the upper ends of the retaining ribs are joined, and a lower connecting ring to which the lower ends of the retaining ribs are joined. Each roller has a pair of projections at its opposite ends, and the rollers are supported for rotation at their projections on the retaining ribs.

6 Claims, 4 Drawing Sheets

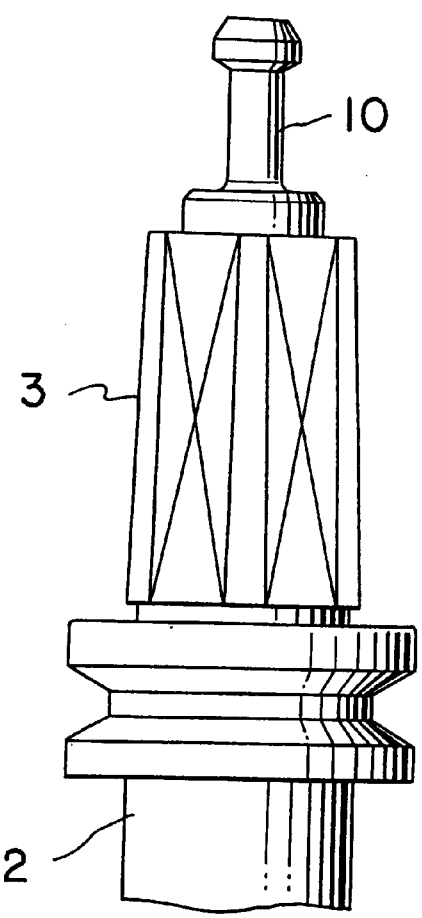
F I G. 5
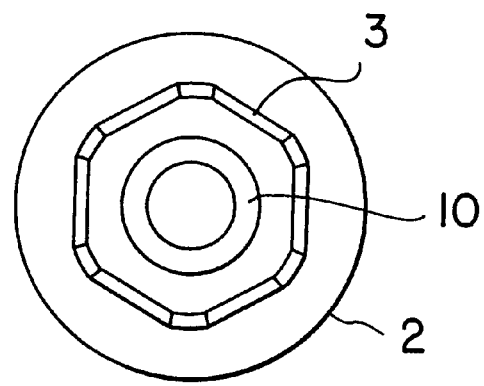
F I G. 6

CUTTING TOOL CHUCK WITH NON-CIRCULAR CROSS-SECTION AND CUTTING TOOL CHUCK ASSEMBLY

This application is a continuation of PCT/JP97/02684 filed Aug. 10, 1997.

FIELD OF THE INVENTION

The present invention relates to a cutting tool chuck to be used on a machine tool, and a cutting tool chuck assembly including the cutting tool chuck. More specifically, the present invention relates to a cutting tool chuck which fits a taper shank of a tool holder or a cutting tool in a tapered bore formed in a spindle of a machine tool, and a cutting tool chuck assembly including the cutting tool chuck.

BACKGROUND ART

Usually, a machine tool uses, when carrying out machining work for cutting a workpiece, such as boring work, with a cutting tool, such as a drill, a reamer or a center drill, a cutting tool chuck which fits a taper shank of a cutting tool or a tool holder in a tapered bore formed in a spindle of a machine tool serving as a component of the cutting tool chuck, and the spindle of the machine tool holding the cutting tool chuck is rotated to carry out desired cutting work for the workpiece.

In such a conventional cutting tool chuck, however, the clamping force which can be exerted on the shank of the tool holder or the cutting tool by the spindle is limited by a frictional force acting between the tapered bore of the spindle and the shank of the tool holder or the cutting tool, and accuracy in mounting the tool holder or the cutting tool is liable to be made unreliable by the fretting of the mating surfaces of the tapered bore of the spindle and the taper shank of the tool holder or the cutting tool. Therefore, It is difficult to achieve heavy cutting work, such as deep hole boring and face milling, accurately with a cutting tool held by the conventional cutting tool chuck.

SUMMARY OF THE INVENTION

The present invention has been made in view of the foregoing problem and it is therefore an object of the present invention to provide a cutting tool chuck and a cutting tool chuck assembly including the cutting tool chuck capable of properly holding a cutting tool for accurate heavy cutting work, such as deep hole boring and face milling.

According to a first aspect of the present invention, a cutting tool chuck for chucking a tool holder or a cutting tool having a prismoidal shank comprises a spindle provided with a tapered bore having a prismoidal shape for receiving the prismoidal shank, and supported for rotation, a retainer placed in the tapered bore of the spindle, and a plurality of rollers held in place by the retainer so as to be in rolling contact with surfaces defining the tapered bore and surfaces of the shank.

According to a second aspect of the present invention, a cutting tool chuck comprises a spindle provided with a first tapered bore having a prismoidal shape and supported for rotation, a tool holder body having a prismoidal shank for receiving the first tapered bore of the spindle, a chucking tube connected to the tool holder body and provided in its front portion with a second tapered bore having a prismoidal shape, and a collet having a prismoidal shape conforming to the second tapered bore of the chucking tube. In this cutting tool chuck, a plurality of first rollers are interposed between surfaces defining the first tapered bore of the spindle and surfaces of the shank of the tool holder body in rolling contact with the surfaces defining the first tapered bore and the surfaces of the shank, and a plurality of second rollers are interposed between surfaces defining the second tapered bore of the chucking tube and outer surfaces of the collet in rolling contact with the surfaces defining the second tapered bore and the outer surfaces of the collet.

According to a third aspect of the present invention, a cutting tool chuck for chucking a cutting tool having a prismoidal shank comprises a spindle provided with a first tapered bore having a prismoidal shape, and a tool holder having a shank of a prismoidal shape for receiving the first tapered bore of the spindle. In this cutting tool chuck, the tool holder is provided with a second tapered bore having a prismoidal shape conforming to the shank of the cutting tool, a plurality of rollers are interposed between surfaces defining the first tapered bore of the spindle and surfaces of the shank of the tool holder so as to be in rolling contact with the surfaces defining the first tapered bore and the surfaces of the shank of the tool holder, and a plurality of second rollers are interposed between surfaces defining the second tapered bore of the tool holder and surfaces of the shank of the cutting tool so as to be in rolling contact with the surfaces defining the second tapered bore of the tool holder and the surfaces of the shank of the cutting tool.

According to a fourth aspect of the present invention, a cutting tool chuck assembly comprises a cutting tool chuck, and a tool holder having a prismoidal shank to be chucked by the cutting tool chuck. In this cutting tool chuck assembly, the cutting tool chuck has a spindle provided with a tapered bore having a prismoidal shape for receiving the prismoidal shank and supported for rotation, a retainer placed in the tapered bore of the spindle, and a plurality of rollers held in place by the retainer so as to be in rolling contact with surfaces defining the tapered bore and surfaces of the shank.

BRIEF DESCRIPTION OF THE DRAWINGS

FIG. 5 is a front view of the shank of the tool holder or the cutting tool to be chucked by the cutting tool chuck of FIG. 1;

FIG. 6 is a plan view of the tool holder or the cutting tool shown in FIG. 1.

BEST MODE FOR CARRYING OUT THE INVENTION

First Embodiment

Preferred embodiments of the present invention will be described hereinafter with reference to the accompanying drawings. FIGS. 1 to 6 illustrates a cutting tool chuck in a first embodiment according to the present invention.

The cutting tool chuck shown in FIGS. 1 to 6 chucks a tool holder or a cutting tool having a prismoidal shank.

Figure 1:
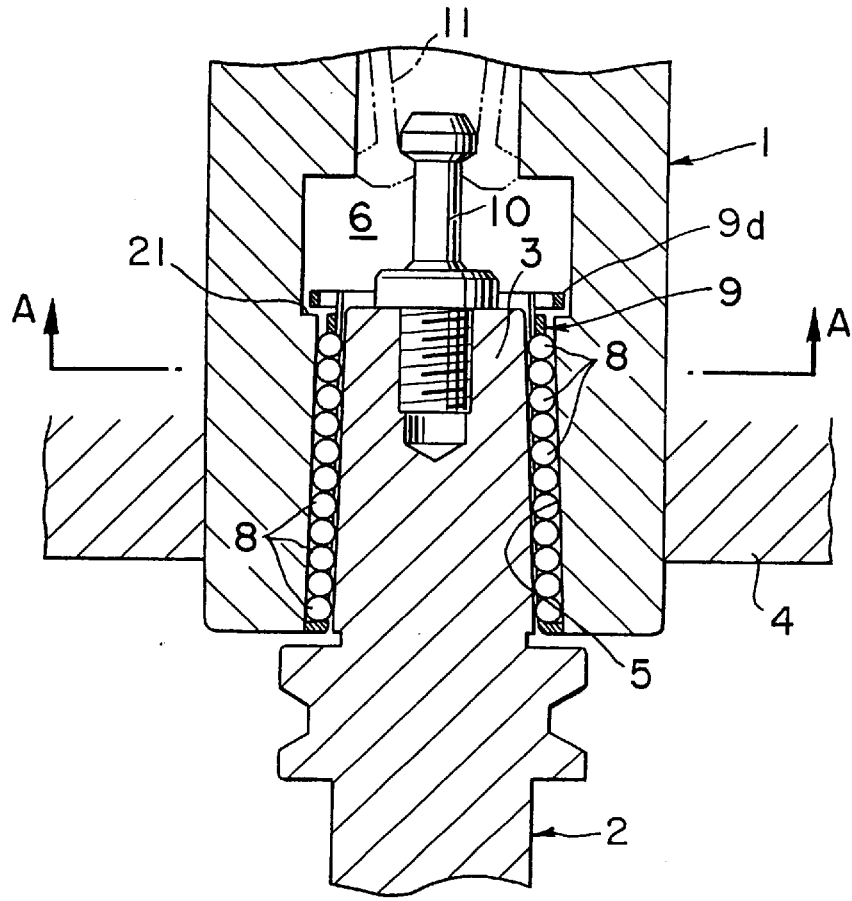
FIG. 1 is an enlarged longitudinal sectional view of a cutting tool chuck in a first embodiment according to the present invention in a state in which the cutting tool chuck is holding a tool holder or a cutting tool.
Figure 2:
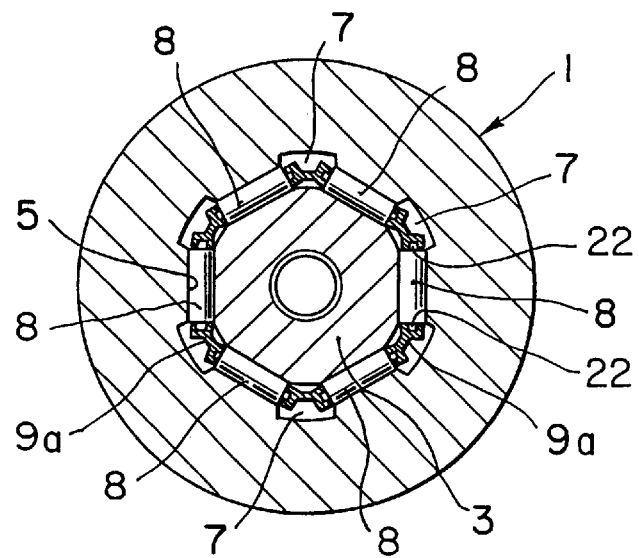
FIG. 2 is a sectional view taken on line A—A in FIG. 1.
Figure 3:
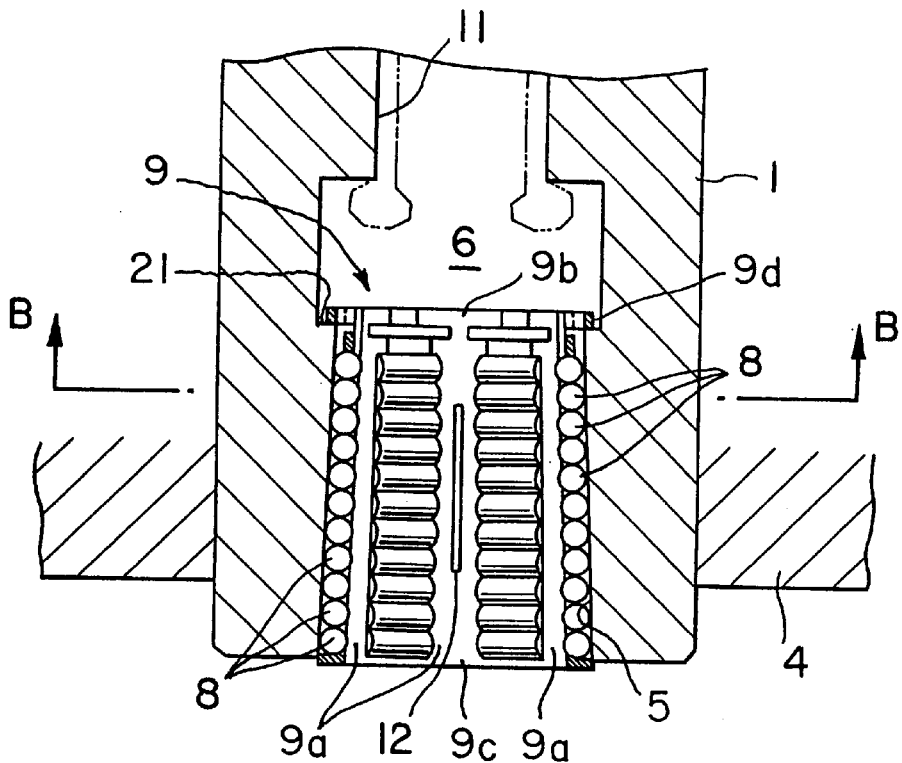
FIG. 3 is an enlarged longitudinal sectional view of the cutting tool chuck of FIG. 1 in a state in which the tool holder or the cutting tool is removed.
Figure 4:
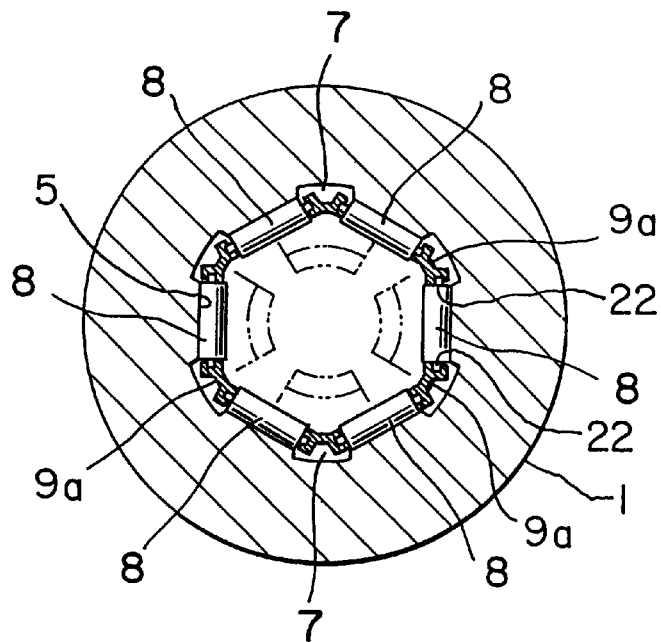
FIG. 4 is a sectional view taken on line B—B in FIG. 3.

FIGS. 1 and 2 shows a state in which a tool holder or a cutting tool is held on a spindle of a machine tool, FIGS. 3 and 4 shows a state in which the spindle is holding neither the tool holder nor the cutting tool, and FIGS. 5 and 6 shows the shank of the tool holder or the cutting tool to be chucked by the cutting tool chuck.

Referring to FIGS. 1 to 4, the cutting tool chuck comprises a spindle 1 provided with a tapered bore 5 having the shape of a regular hexagonal prismoid to receive a shank 3 of a tool holder (or cutting tool) 2 therein, a retainer 9 disposed in the tapered bore 5 of the spindle 1, and a plurality of rollers 8 held in place by the retainer 9 so as to be in rolling contact with the surfaces defining the tapered bore 5 and the surfaces of the shank 3 inserted in the tapered bore 5. The spindle 1 is supported for rotation on a frame 4 of a machine tool.

Referring to FIGS. 3 and 4, the retainer 9 has a plurality of retaining ribs 9a extending along ridge sections of the tapered bore 5, an upper connecting ring 9b to which the upper ends of the retaining ribs 9a are joined, and a lower connecting ring 9c to which the lower ends of the retaining ribs 9a are joined. The retainer 9 is provided at its upper end with fingers 9d. The fingers 9d are brought into engagement with a shoulder 21 formed at the upper end of the tapered bore 5 to support the retainer 9 so that the retainer 9 may not fall down as viewed in FIG. 3. The plurality of rollers 8 are held between the adjacent retaining ribs 9a. As shown in FIGS. 2 and 4, each roller 8 has a pair of projections (support shafts) 22 at its opposite ends and the rollers 8 are supported for rotation at their projections 22 on the retaining ribs 9a. As shown in FIG. 3, each retaining rib 9a is provided with a longitudinal slit 12 in its middle portion.

A relief pocket 6 is formed in the spindle 1 behind the tapered bore 5 having the shape of a regular hexagonal prismoid. As shown in FIGS. 2 and 4, six relief grooves 7 are formed on the inner surfaces of the tapered bore 5 of the spindle 1 in portions corresponding to the six ridge sections so as to extend along the ridge sections. The retaining ribs 9a of the retainer 9 are disposed in the relief grooves 7, respectively.

As shown in FIGS. 2 and 6, the shank 3 of the tool holder (or the cutting tool) 2 has the shape of a regular hexagonal prismoid, and the edges of the shank 3 are chamfered. As shown in FIGS. 5 and 6, a pull stud 10 to be gripped by fingers 11 disposed in a bore of the spindle 1 is attached to the upper end of the tool holder (or the cutting tool) 2.

The operation of the first embodiment thus constituted will be described hereinafter.

Referring to FIGS. 1 and 2, when performing a cutting operation, the tool holder (or the cutting tool) 2 is inserted in the tapered bore 5 of the spindle 1, the fingers 11 disposed in the bore of the spindle 1 grip the pull stud 10 attached to the upper end of the tool holder (or the cutting tool) 2 and pulls up the tool holder (or the cutting tool) 2.

The surfaces of the shank 3 of the tool holder (or the cutting tool) 2 thus pulled up by the fingers 11 gripping the pull stud 10 are firmly engaged through the plurality of rollers 8 with the surfaces of the tapered bore 5.

After the machining operation has been completed, the tool holder (or the cutting tool) 2 is removed from the spindle 1 as shown in FIGS. 3 and 4.

As mentioned above, the plurality of rolls 8 are interposed between the surfaces defining the prismoidal tapered bore 5 of the spindle 1 and the surfaces of the prismoidal shank 3 of the tool holder (or the cutting tool) 2 so as to be in rolling contact with the surfaces defining the tapered bore 5 of the spindle 1 and the surfaces of the shank 3 of the tool holder (or the cutting tool) 2 in the cutting tool chuck in the first embodiment. Therefore, the shank of the tool holder (or the cutting tool) 2 can be held on the spindle by an augmented clamping force. The fretting of the mating surfaces of the tapered bore and the tapered shank can be limited to the least extent. Accordingly, heavy machining operations requiring a high cutting force, such as deep hole boring and face milling, can be achieved in a high accuracy. The plurality of rollers 8 facilitates work for removing the tool holder (or the cutting tool) 2 from the spindle 1.

Since the plurality of rollers 8 are supported for rotation at their projections 22 on the adjacent retaining ribs 9a, the plurality of rollers 8 (in FIGS. 1 to 4, eleven rollers 8) can be arranged vertically with the adjacent rollers 8 in contact with each other.

Since the retaining ribs 9a are provided in their middle portions with the slits 12, respectively, the retainer 9 can be made to expand in the tapered bore 5 expanding toward the free end of the spindle 1 (downward as viewed in FIG. 3) so that the retainer 9 is always biased resiliently toward the free end of the spindle 1 by increasing the width of the middle portions of the retaining ribs 9a in which the slits 12 are formed by a size about equal to the width of the slits 12. When the middle portions of the retaining ribs 9a are thus expanded, the retainer 9 is biased resiliently downward after the tool holder (or the cutting tool) 2 has been removed from the spindle 1, so that the fingers 9d are pressed against the shoulder 21 formed at the upper end of the tapered bore 5 to prevent the retainer 9 from unsteadily moving on the spindle 1 after the tool holder (or the cutting tool) 2 has been removed from the spindle 1.

Second Embodiment

A cutting tool chuck in a second embodiment according to the present invention will be described hereinafter with reference to FIG. 7. The second embodiment is substantially the same as the first embodiment illustrated in FIGS. 1 to 6, except that rollers are used not only for clamping the tool holder to a spindle but also for clamping a cutting tool on a tool holder. Parts of the second embodiment like or corresponding to those of the first embodiment shown in FIGS. 1 to 6 are designated by the same reference numerals and the description thereof will be omitted.

Figure 7:
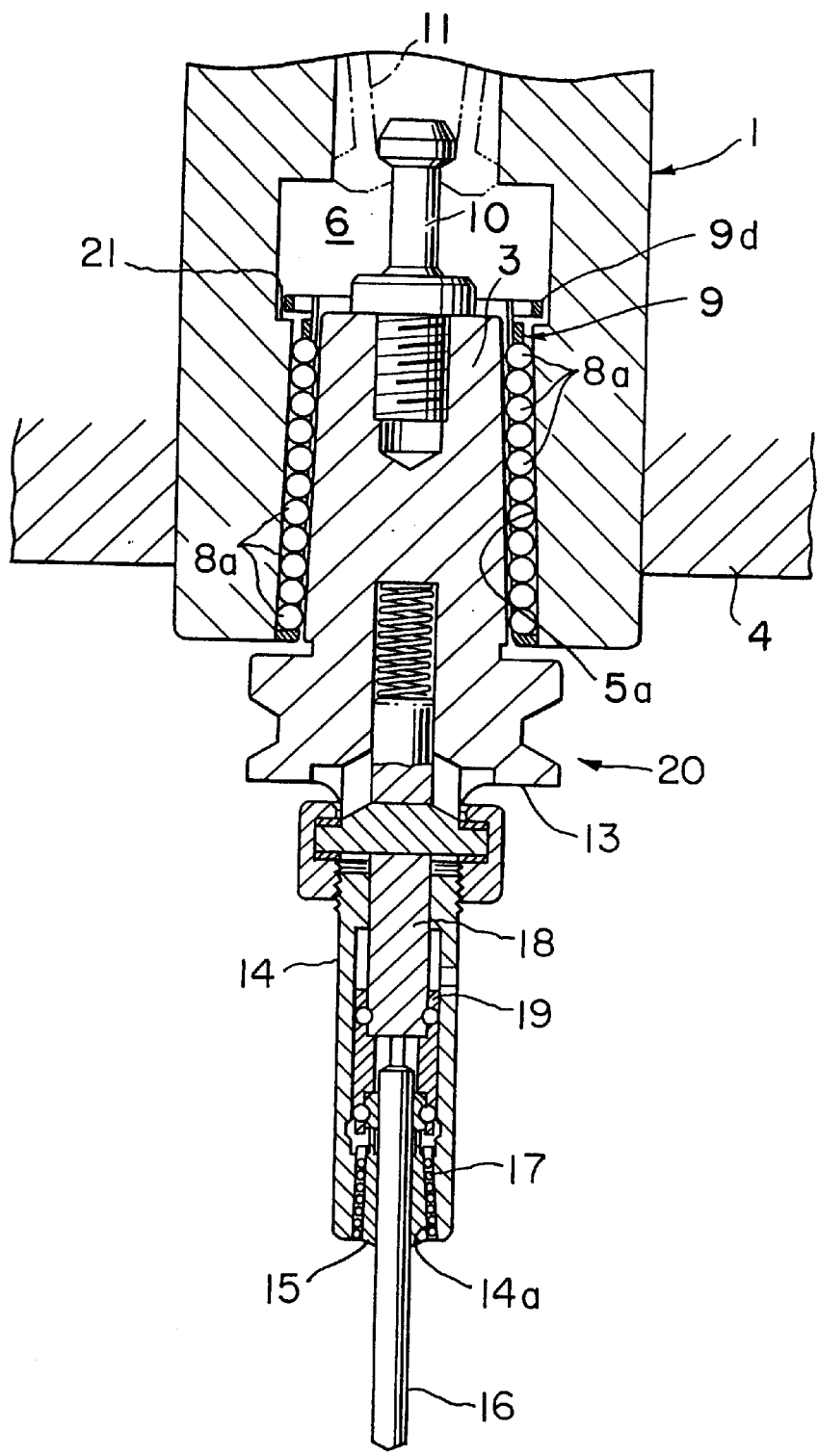
FIG. 7 is a longitudinal sectional view of a cutting tool chuck in a second embodiment according to the present invention.

Referring to FIG. 7, the cutting tool chuck comprises a spindle 1 provided with a first tapered bore 5a having the shape of a regular hexagonal prismoid and supported for rotation, a tool holder 20 having a shank 3 having the shape of a regular hexagonal prismoid to be inserted in the first tapered bore 5a of the spindle 1, a retainer 9 disposed in the first tapered bore 5a of the spindle 1, and a plurality of first rollers 8a held in place by the retainer 9 so as to be in rolling contact with the surfaces defining the first tapered bore 5a and the surfaces of the shank 3 inserted in the first tapered bore 5a.

The tool holder 20 comprises a tool holder body 13, a chucking tube 14 joined to the tool holder body 13 and provided in its front end portion with a second tapered bore 14a having the shape of a regular hexagonal prismoid, and a collet 15 having the shape of a regular hexagonal prismoid and inserted in the second tapered bore 14a of the chucking tube 14. A cutting tool 16 is held in a central bore formed in the collet 15. The collet 15 is connected by a connecting tube 19 to a drive shaft 18.

A plurality of second rollers 17 are disposed between the surfaces defining the second tapered bore 14a of the chucking tube 14 and the collet 15 so as to be in rolling contact with the surfaces defining the second tapered bore 14a and the outer surfaces of the collet 15. Preferably, the second rollers 17 are held by a retainer of the same construction as that of the retainer 9 employed in the first embodiment shown in FIGS. 1 to 4.

The operation of the second embodiment thus constituted will be described hereinafter.

Referring to FIG. 7, when performing a cutting operation, the fingers 11 disposed in the bore of the spindle 1 grip the pull stud 10 attached to the upper end of the tool holder 20 and pulls up the tool holder 20.

The surfaces of the shank 3 of the tool holder 20 thus pulled up by the fingers 11 gripping the pull stud 10 are firmly engaged through the plurality of first rollers 8a with the surfaces of the tapered bore 5a.

On the other hand, the cutting tool 16 is inserted in the collet 15 and the drive shaft 18 is pulled upward. Consequently, the outer surfaces of the collet 15 are firmly engaged through the second rollers 17 with the surfaces defining the second tapered bore 14a.

Thus, the second embodiment has the second rollers 17 interposed between the surfaces defining the prismoidal second tapered bore 14a of the chucking tube 14 and the prismoidal collet 15 so as to be in rolling contact with the surfaces defining the second tapered bore 14a of the chucking tube 14 and the outer surfaces of the collet 15 as well as the first rollers 8a interposed between the surfaces defining the prismoidal first tapered bore 5a of the spindle 1 and the prismoidal shank 3 of the tool holder 20. Therefore, augmented clamping forces can be exerted on the cutting tool 16 and the tool holder 20, respectively. The fretting of the mating surfaces of the tapered portions can be limited to the least extent. Accordingly, heavy machining operations requiring a high cutting force, such as deep hole boring and face milling, can be achieved in a high accuracy.

Although the collet 15 gripping the cylindrical cutting tool 16 is clamped in the second tapered bore 14a through the second rollers 17 in the second embodiment, the cutting tool 16 may be provided with a prismoidal shank, and the prismoidal shank of the cutting tool 16 may be inserted in a prismoidal second tapered bore formed in the extremity of a tool holder and the shank may be clamped through second rollers on the tool holder.

Although the respectively cross sections of the tapered bores 5, 5a and 14a, the shank 3 and the collet 15 employed in the first and the second embodiment have the shapes of regular hexagons, respectively, the shapes of those cross sections need not be limited thereto, but may be any suitable shapes, such as quadrangular shapes or octagonal shapes.

What is claimed:

1. A cutting tool chuck for chucking a tool holder or a cutting tool having a prismoidal shank, comprising:

a spindle provided with a tapered bore having a prismoidal shape for receiving the prismoidal shank, and supported for rotation;

a retainer placed in the tapered bore of the spindle; and a plurality of rollers held in place by the retainer so as to be in rolling contact with surfaces defining the tapered bore and surfaces of the shank.

2. The cutting tool chuck according to claim 1, wherein the retainer has a plurality of retaining ribs extending along ridge sections of the tapered bore, an upper connecting ring to which upper ends of the retaining ribs are joined, and a lower connecting ring to which lower ends of the retaining ribs are joined; and the plurality of rollers are held between the adjacent retaining ribs.

3. The cutting tool chuck according to claim 2, wherein each of the rollers has a pair of projections at its opposite ends, and the rollers are supported for rotation at their projections on the retaining ribs.

4. The cutting tool chuck according to claim 2, wherein each of the retaining ribs is provided with a longitudinal slit in its middle portion.

5. The cutting tool chuck according to claim 2, wherein a plurality of relief grooves are formed in inner surfaces of the tapered bore of the spindle in portions corresponding to the ridge sections so as to extend along the ridge sections, and the retaining ribs of the retainer are disposed in the relief grooves, respectively.

6. A tool holder having a prismoidal shank to be chucked by the cutting tool chuck according to claim 1.

\* \* \* \* \*